Feb. 2, 1954 — S. G. TILDEN — 2,667,948
BRAKE SHOE ASSEMBLY
Filed May 26, 1947 — 2 Sheets-Sheet 1
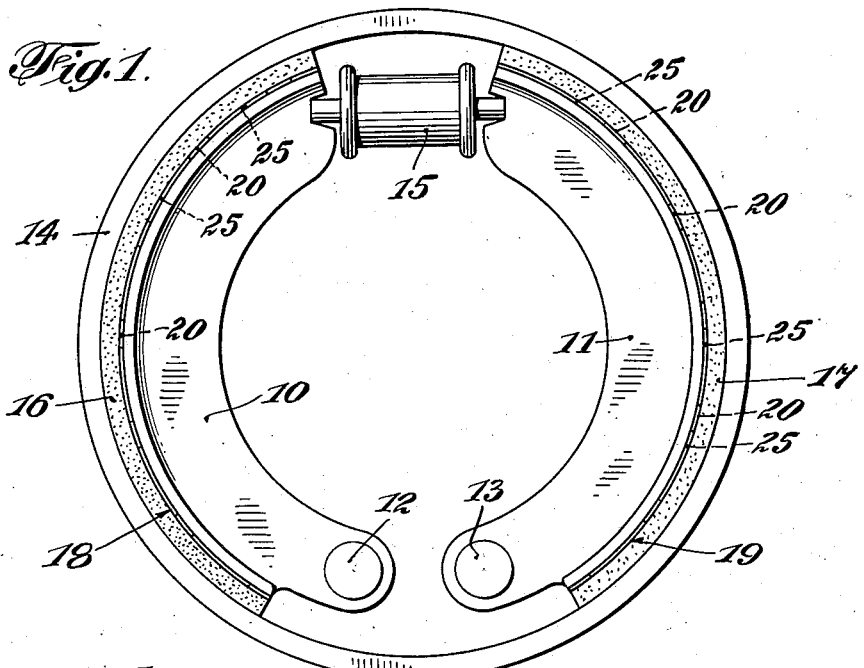
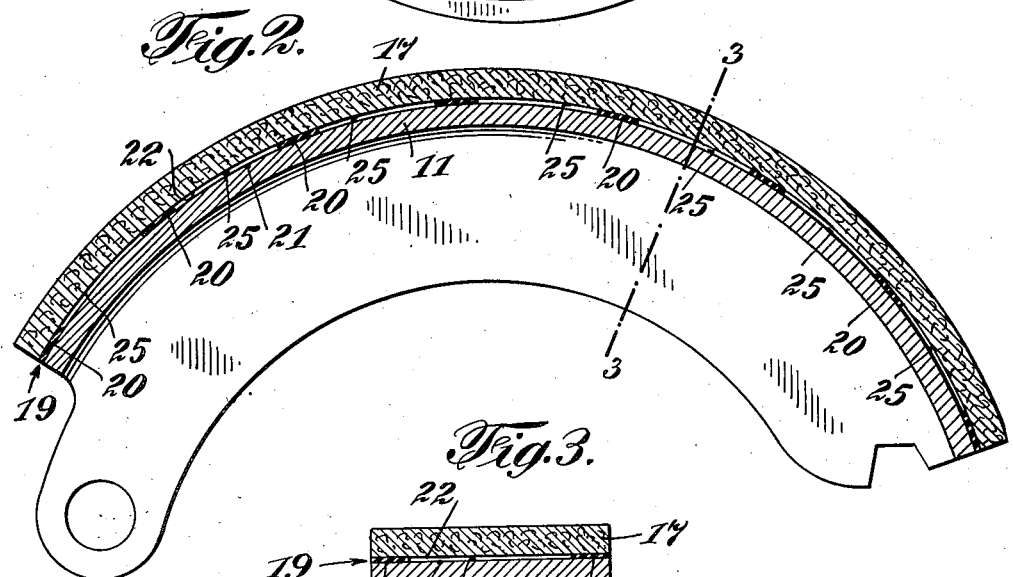
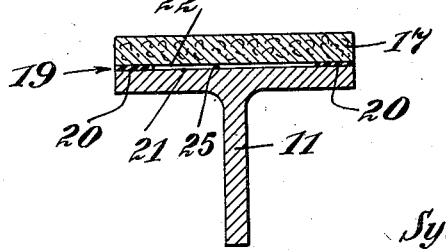
INVENTOR.
Sydney G. Tilden
BY
his ATTORNEY Feb. 2, 1954 S. G. TILDEN 2,667,948
BRAKE SHOE ASSEMBLY
Filed May 26, 1947 2 Sheets-Sheet 2
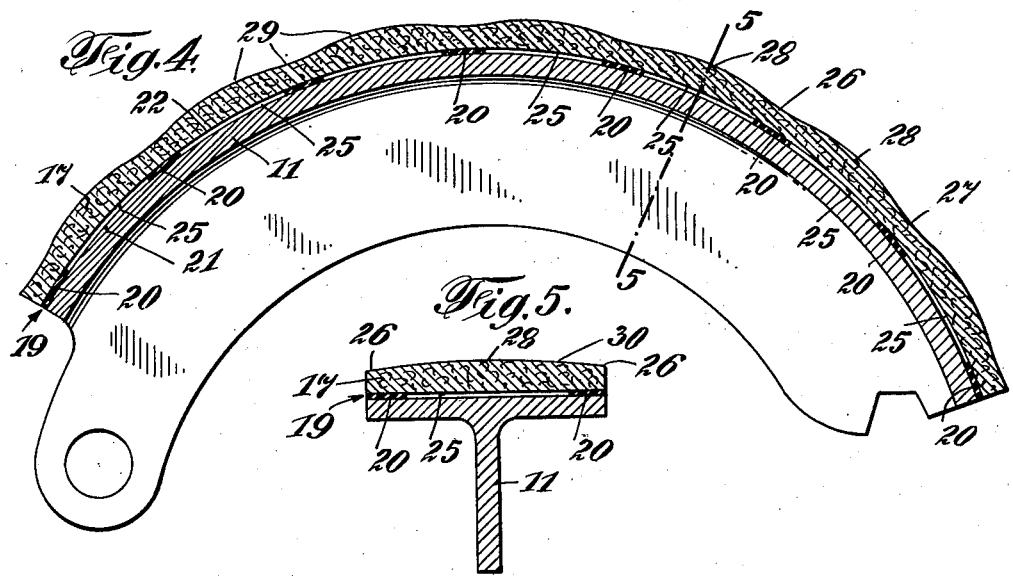
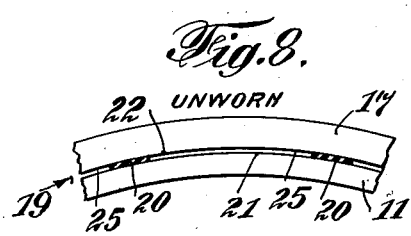
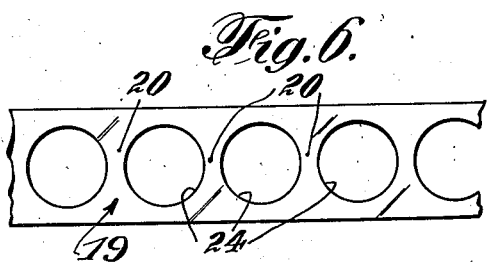
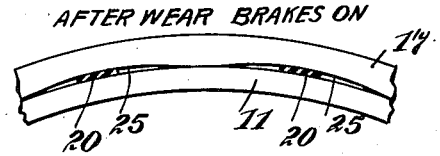
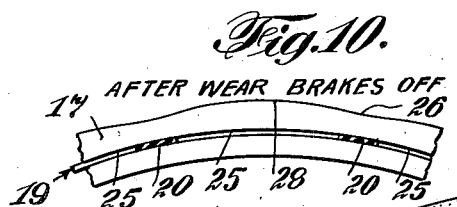
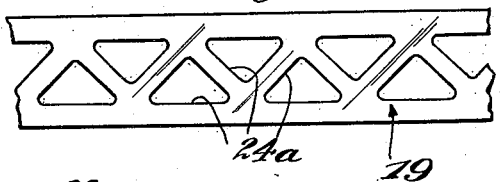
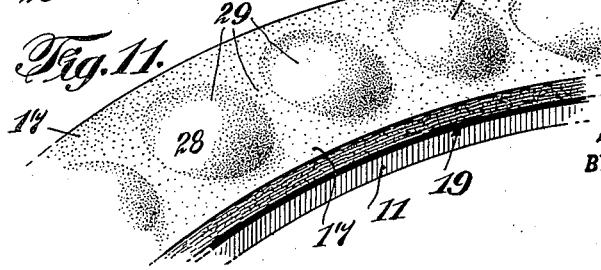
INVENTOR.
Sydney G. Tilden
BY C. P. Goepel
his ATTORNEY Patented Feb. 2, 1954

2,667,948

UNITED STATES PATENT OFFICE 2,667,948

BRAKE SHOE ASSEMBLY

Sydney G. Tilden, Stewart Manor, N. Y., assignor to The Permafuse Corp., a corporation of New York Application May 26, 1947, Serial No. 750,398

1 Claim. (Cl. 188—234)

This invention relates to brake shoe assemblies.

It is known to the art to employ dry tapes, usually composed of a heat resistant filler material coated, or impregnated and coated, with a synthetic resinoid capable of being reacted under heat. Such a tape is placed between a segment of brake lining friction material and the brake shoe, the three parts being clamped together and heated until the resin reacts and bonds the brake lining segment to the brake shoes by cementitious adhesion. I have found that in brakes utilizing such brake lining friction material segments attached to the brake shoes by such tapes show a considerable increase of the squeaking noises when the brakes are applied. This is believed to be largely due to the increased rigidity of the bonded assembly, that is the brake shoe with the brake lining friction material segment bonded to it, which is longitudinally rigid. The rigidity of the bonded brake shoe assembly does not permit it to flex, so as to change its arc in order to conform to the contour of the brake drum. Also, known brake drums change in size and shape under the heat and pressure generated in the braking action. High pressure areas at the ends of each bonded assembly are also responsible, at least partially, for the very annoying squeaking of brakes.

Such bonded assemblies have many advantages over the older types in which rivets are used to attach the friction material to the brake shoe, but the aforesaid squeaking presented a serious problem. In order to overcome this objection to brake lining friction segments bonded to brake shoes by any of the cementitious means heretofore used, I have developed such a segment which essentially provides a cushioning effect when the brake is applied, and thus removes the aforesaid rigidity. I have also developed bonded tape which, because of its particular design, does not provide attachment over the entire adjacent surfaces of the brake lining friction material segment and the brake shoe thereby providing means having all of the aforesaid advantages of bonding yet permitting the flexing of certain areas of the brake lining friction material segment under the pressure encountered in actual use.

The invention consists in the provision of a brake lining friction material segment having spaced members forming spaces along the brake shoe contour, such spaces being bounded by the outer surface of the brake shoe, the inner surface of the segment and by a pair of pressure resisting members secured to the brake shoe, whereby the spaced portion of the inner surface of the segment yields to pressure thus giving the segment a cushioning effect.

The invention also consists of a brake lining friction material segment having spaced hills and valleys on the brake drum adjacent surface and having bonding means on the brake shoe adjacent surface of the segment corresponding only to the spaces between said hills of the drum adjacent surface, whereby, when said hills are pressed, there is a freedom of movement of the hill portions towards the brake shoe. The invention consists also in the combination of a brake lining friction material segment and a bonding tape having spaced openings. The invention consists also of a bonding tape having spaced openings.

The invention will be more fully described hereinafter, embodiments thereof shown in the drawings, and the invention will be finally pointed out in the claim.

In the accompanying drawings,

Fig. 1 is a view of a brake drum assembly showing the brake shoes, brake friction material segments and brake drum in a normal operating position having the improved tape bonding the friction material to the brake shoe;

Fig. 2 is a longitudinal section of a new or unworn brake shoe and lining assembly in which the attachment of the brake lining friction material segment to the brake shoe is by means of my improved bonding tape;

Fig. 3 is a transverse section on line 3—3 of Fig. 2;

Fig. 4 is a longitudinal section of a brake shoe and lining assembly in which the attachment of the brake lining friction material segment to the brake shoe is by means of my improved bonding tape, showing the variation in thickness of the brake lining friction material segment as a result of wear;

Fig. 5 is a transverse section on line 5—5 of Fig. 4;

Fig. 6 is a plan view of one embodiment of the invention showing a piece of my improved bonding tape;

Fig. 7 is a plan view of another embodiment showing a piece of my improved bonding tape;

Figs. 8 to 10 show diagrammatic views to explain the operation of the invention, Fig. 8 showing the brake lining friction material segment bonded to a brake shoe by the improved tape before use, Fig. 9 showing the same parts, but after the use of the same with brakes on, and Fig. 10 showing the same parts after use, with brakes off; and Fig. 11 is a perspective view of the outer surface of the segment, after a wear of the same, and when the brakes are off, showing a plurality of successive yieldable protuberances of general spherical shape.

Similar characters of reference indicate corresponding parts throughout the various views.

An embodiment of the improved brake lining friction material segment 17 bonded to a brake shoe 11, is shown in Fig. 11.

Referring to Fig. 1, the substantially arcuate brake shoes 10 and 11 hinge on anchor pins 12 and 13 and are moved outwardly against the brake drum 14 by means of an hydraulic actuating cylinder 15. The brake shoes 10 and 11 are lined with brake lining friction material segments 16 and 17 which are bonded to the brake shoes 10 and 11 by means of improved bonding strips 18 and 19. These parts, with the exception of the improved bonding strips, are shown as typical of the known art.

In Fig. 2, which is a longitudinal section of the brake shoe 11, somewhat enlarged over Fig. 1, the new or unworn brake lining friction material segment 17 is shown bonded to the brake shoe 11 by means of the improved bonding strip 19. The bonding parts are shown by 20, and the spaces between the outer surface 21 of the brake shoe and inner surface 22 of the friction material, are shown by 25.

In Fig. 3, which is a transverse section of the assembly on line 3—3 of Fig. 2, the new or unworn brake lining friction material segment 17 is shown bonded to the brake shoe 11 by means of the improved bonding strip 19. Between the outer surface 21 of the brake shoe 11 and the inner surface 22 of the friction material segment 17, a space 25 is arranged between the bonding parts 20.

This space 25 is important as it provides for a play of the intervening part of the lining 17, the ends of which are supported by the bonding parts 20. This space enables that part of the segment to give under pressure as the brakes are applied. There is thus provided a cushioning effect which results in faster wear of the brake lining friction material segment adjacent at the bonding part 20 and slower wear adjacent at the unsupported or yieldable parts 25.

In Fig. 4, the longitudinal variation in the thickness of the brake lining friction material 17 caused by such uneven wear induced by the uneven pressure is shown. Such uneven wear also takes place transversely, as shown in Fig. 5.

In both Fig. 4 and Fig. 5 the brake shoe is presumed to be in the off position and not contacting the brake drum.

In Fig. 6, the improved bonding strip 19 is shown in plan view with spaced round holes 24 in the continuous tape at regular and close intervals.

In Fig. 7, the improved bonding tape 19, in another embodiment, is shown with triangular holes 24a in the continuous tape at regular and close intervals.

The length of a strip used when applied to the brake shoe surface is equal to the longitudinal length of the brake shoe surface, and the width of the strip is substantially equal to the width of the brake shoe surface. The brake shoe surface and the adjacent segment surface and the strip or tape are in faying relationship with each other. The body of the strip or tape surrounding the openings is practically incompressible by the pressure applied by the brake drum. The portions of the segment radially of the openings in the strip, however, flex through the openings to the brake shoe surface.

Referring again to Figs. 2 and 3, it can be seen that the brake lining friction material segment 17 attached to the brake shoe 11 is unsupported over a considerable portion of its area depending upon the size, shape and frequency of the relieving holes 24, as shown, in Figs. 6 and 7. Furthermore, the brake lining friction material segment 17 is separated from the brake shoe 11 at this cut-out or relieved portion by an amount equal to the thickness of the bonding tape, which is usually between 0.007" and 0.030". The brake lining friction material segment 17 is thus free to flex in these unsupported areas and the pressure between the brake shoe 11 and the brake drum 14 will vary over the periphery of the brake lining segment 17 depending on the size and frequency of the relieving holes. I have found that, in order to secure these benefits, the ratio of bonded areas to unsupported areas should be in the range of 1½:1 to 1:1.

When the brake shoes 11 and 12 are forced against the brake drum 14 by the action of the hydraulic cylinder 15, pressure on the brake drum 14 will be greatest at areas opposite the solid portions of the bonding strip 19 and least over the cut-out or relieved area of the bonding strip 19. Since the brake lining friction material segment 17 will wear in proportion to the unit pressure transmitted between the brake shoe 11 and the brake drum 14, areas directly over the solid portion of the bonding strip 19, as at 26 and 27, will wear more than areas over the unsupported areas as at 28. This alternative greater pressure and less pressure, after a time, will result in a wavy surface 29 as shown in Fig. 4, and laterally in the curved contour 30 as shown in Fig. 5. As the brakes are applied, the raised or high areas 28 of the brake lining friction material segments 16 and 17 will contact the brake drum 14 first, and with a light springing action. As pressure is continued, these unsupported areas will move or spring inwardly until the whole area of the brake lining friction material segment 16 and 17 is in contact with the brake drum 14. This variation in contact and pressure results in preventing vibrations set up by the rubbing action of the brake lining friction material segment on the braking surface of the brake drum which caused heretofore very annoying brake squeak or noises in normal braking operation. Instead of making the improved brake lining friction material segment as described, the segment may be made separately as a unit by a pressure or molding method and then applied to a brake shoe. The advantage of making the segment by use with a brake drum as described is that brake drums, even of the same type made in mass production, have certain variations in shape and different natural vibration periods, and a segment when so made is, so to say, glove fitting. Essentially, however, an independently made segment but with the hills adjacent to the brake shoe, in relief, or cameo, provides a novel segment having all of the advantageous attributes set forth herein. Such a segment may be bonded to a brake shoe with solid or not cut-out tape, or with liquid or paste cements of the prior art, since attachment by bonding is only achieved when the parts to be bonded are in intimate contact. Thus the only portions of the segment which would be bonded to the brake shoe would be the raised portions or hills with the intervening portions uncemented and yieldable. In other words, yieldability of the segment obtained by hollowing out or relieving areas on the inside surface of the segment which is adjacent to the brake shoe. Thereafter, in use, the areas opposite the supported areas will exert the greatest pressure on the brake drum and will wear most while areas opposite the unsupported areas will exert the least pressure on the brake drum and will wear least resulting in a contour substantially like Figure 11 on the drum adjacent surface of the segment.

In order to emphasize the mode of operation of the embodiment of Figure 6, diagrammatic drawings, Figs. 8 to 10, are shown. In Fig. 11, the perspective view of the segment 17 shows the successive protuberances on the outer surface of the segment resulting from the use of a bonding member as shown in Fig. 6, and when the brakes are off, and after some wear, corresponding to Fig. 10. The spherical protuberances 28 of Fig. 10 act in the nature of springs, in that they have an inherent resiliency, which are pressed towards the brake shoe when the brakes are on, like in Fig. 9. In consequence, the space 25 in Fig. 10 is partially filled, as shown in Fig. 9, by an inward spherical like protuberance bottoming on the brake shoe. A similar action would take place, when the form shown in Fig. 7 is used, though the protuberances would be smaller or of different marginal contour. There is thereby provided a continuous segment having a plurality of successive protuberances yieldably supported between the bonded portions of the segment.

The flexibility of the lined brake shoe assembly is increased since the brake lining friction material segment, being bonded to the shoe at intermittent points only, permits a slight flexing of the parts of the segment to conform to the brake drum in actual service, thus reducing or eliminating brake squeak, or higher frequency noises.

A still further advantage of the improved bonded brake lining friction segments to brake shoes is that the aforesaid cushion action is obtained, which assists in initially gripping the brake drum in a yielding manner until the entire force is applied. This results in greatly improved control of the brakes by reducing any tendency for the brakes to grab under a quick application and the resulting braking action is smoother, quieter and more pleasing to the operator, and also more efficient.

Another embidiment would be to provide the segment on its brake shoe adjacent surface with spaced integral abutments providing intervening spaces. For instance, the parts 29 would be part of the segment 17, in Fig. 2. Instead of these integral abutments, the ordinary concentric segment may be used and separate shims provided at spaced points again providing intervening spaces. The attachment of either of these forms may be by a bonding tape, or by cement or by rivets. Obviously, when rivets are used, a bonding tape or cement is not necessary. Instead of separate shims, a shim tape provided with openings such as in Figs. 6 and 7, may be used which may or may not be provided with adhesion material.

The underlying mechanic is the application of a beam to two spaced abutments in which the central portion of the beam is subjected to a flexing action.

The cushioning effect in contrast to a longitudinally rigid brake assembly, as also in contrast to the yieldability obtained by the spaced members providing intermediate spaces between portions of the segment and the brake shoe thus allowing for the flexing of such portions, longitudinally and transversely, serves as a noise dampener. That is, high frequency vibrations are not produced as in the case of the rigid assembly.

The noises which are most distressing to the human being are the high pitched noises, some of which may have a frequency of as high as 10,000 double vibrations per second above which the sound is not audible to the human ear. Noises from typewriters, adding machines, dishes, and the like are high pitched (about 4,000 double vibrations per second). Brake shoe noises are higher in frequency, and in some cases, it is assumed may be higher in frequency than the audible noises, and perhaps injurious to the hearer. The importance of providing means to mitigate or prevent noises of brake shoes is evident.

The underlying concept of the foregoing embodiments is the provision of a brake lining friction material segment having spaced members forming spaces along the brake shoe contour, such spaces being bounded by the outer surface of the brake shoe, the inner surface of the segment yields to pressure thus giving the segment a cushioning effect.

I have described several forms of my invention, but obviously various changes may be made in the details disclosed without departing from the spirit of the invention as set out in the following claim:

I claim:

In a brake assembly having a brake drum, a substantially arcuate brake shoe and a friction material segment of uniform density and uniform resistance to pressure in faying relationship with, and interposed between the said brake drum and the said brake shoe, the combination therewith of an adhesive tape, said adhesive of said tape adhering to the opposed brake shoe and segment surfaces, said tape being substantially incompressible, and non-shiftable to said adjacent brake shoe and segment surfaces on the application of radial forces between said brake drum and said brake shoe when said brake shoe is applied, said tape having surfaces in faying relationship with the surfaces of said brake shoe and said segment circumferentially and axially of the brake shoe and from end to end and side to side thereof, said tape having a series of openings circumferentially disposed in relation to the axis of said drum and shoe, closely adjacent to each other and completely surrounded by said incompressible portions of said tape and of a size adapted to receive portions of said segments flexing through said openings in pressed contact against said brake shoe, whereby said radial forces are prevented from radially moving the segment portions adjacent said tape in a radial direction of said tape and said radial forces cause portions of said segment radially adjacent of the openings in said tape to yield to said forces by flexing the portions of said segment radially adjacent said openings into said openings.

SYDNEY G. TILDEN.

References Cited in the file of this patent

UNITED STATES PATENTS

| Number | Name | Date |
| --- | --- | --- |
| 1,563,368 | Hutchinson | Dec. 1, 1925 |
| 1,664,855 | Gard | Apr. 20, 1926 |
| 1,716,090 | Schmidt | June 4, 1929 |
| 1,756,936 | Bendix | May 6, 1930 |
| 1,848,084 | Bendix | Mar. 1, 1932 |
| 1,872,547 | Zeder | Aug. 16, 1932 |
| 2,400,995 | Humphner | May 28, 1946 |
| 2,581,926 | Groten et al. | Jan. 8, 1952 |